United States Patent
Struschka (10) Patent No.: US 12,128,866 B2
(45) Date of Patent: Oct. 29, 2024

(54) ELECTRICALLY ACTIVATABLE ACTUATING UNIT FOR A MOTOR VEHICLE BRAKE SYSTEM, BRAKE BOOSTER HAVING SUCH AN ELECTRICALLY ACTIVATABLE ACTUATING UNIT AND MOTOR VEHICLE BRAKE SYSTEM HAVING SUCH A BRAKE BOOSTER

(71) Applicant: ZF Active Safety GmbH, Koblenz (DE)

(72) Inventor: Martin Struschka, Braubach (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 142 days.

(21) Appl. No.: 17/218,642

(22) Filed: Mar. 31, 2021

(65) Prior Publication Data
US 2021/0309190 A1   Oct. 7, 2021

(30) Foreign Application Priority Data
Apr. 3, 2020   (DE) .......................... 102020109453.1

(51) Int. Cl.
*B60T 7/06*      (2006.01)
*B60T 7/12*      (2006.01)
(Continued)

(52) U.S. Cl.
CPC ................. *B60T 7/06* (2013.01); *B60T 11/18* (2013.01); *B60T 13/745* (2013.01); *B60T 17/18* (2013.01); *B60T 7/12* (2013.01); *B60T 2201/03* (2013.01)

(58) Field of Classification Search
CPC .... B60T 13/145; B60T 13/745; B60T 13/575; B60T 13/66; B60T 7/042; B60T 7/06;
(Continued)

(56) References Cited

U.S. PATENT DOCUMENTS 4,615,229 A * 10/1986 Granbom ............ F16H 25/2252
                                                74/424.92
5,158,004 A * 10/1992 Bauer .................... B60T 13/575
                                                91/369.2
(Continued)

FOREIGN PATENT DOCUMENTS

DE      102012205611 A1    10/2013
DE      102014208599 A1 *  11/2015 .............. B60T 13/40
(Continued)

OTHER PUBLICATIONS

German Search Report for corresponding German Application Serial No. 202833DENP966, dated Aug. 18, 2021, pp. 1-6.

*Primary Examiner* — Thomas J Williams
(74) *Attorney, Agent, or Firm* — Kristin L. Murphy (57) ABSTRACT

The present disclosure relates to an electrically activatable actuating unit (106) for a motor vehicle brake system (1000), having a housing body (122) and an actuating member (124) arranged in a recess (150) of the housing body (122), wherein the actuating member (124) is coupleable to a brake pedal at a first end and coupleable to a motor vehicle brake (400) at a second, opposite end. The housing body (122) and the actuating member (124) are arranged to be displaceable in a braking direction to actuate the motor vehicle brake (400). The electrically activatable actuating unit (106) furthermore comprises a damping element (180, 180A, 180B), which is arranged in the recess (150) of the housing body (122) such that it abuts frictionally against an outer wall of the actuating member (124) by means of an inner circumferential face (184) and abuts frictionally against an inner wall (170) of the housing body (122) by means of an outer, opposite circumferential face (186), which inner wall delimits the recess (150).

25 Claims, 4 Drawing Sheets

(51) Int. Cl.
 *B60T 11/18* (2006.01)
 *B60T 13/74* (2006.01)
 *B60T 17/18* (2006.01)

(58) Field of Classification Search
 CPC . B60T 7/12; B60T 11/18; B60T 17/18; B60T 2201/03; B60T 13/74; F15B 7/08
 See application file for complete search history.

(56) References Cited

U.S. PATENT DOCUMENTS

| | | | | |
|---|---|---|---|---|
| 6,044,750 | A * | 4/2000 | Eick | B60T 13/72 |
| | | | | 91/367 |
| 6,203,022 | B1 * | 3/2001 | Struschka | B60T 11/236 |
| | | | | 277/560 |
| 6,209,967 | B1 * | 4/2001 | Kramer | B60T 13/72 |
| | | | | 303/114.3 |
| 6,347,570 | B1 * | 2/2002 | Inoue | B60T 13/575 |
| | | | | 91/367 |
| 11,787,380 | B2 * | 10/2023 | Calvo Martinez | B60T 13/745 |
| | | | | 188/72.1 |
| 2007/0261545 | A1 * | 11/2007 | Kramer | B60T 13/575 |
| | | | | 91/369.2 |
| 2010/0176653 | A1 * | 7/2010 | Arakawa | B60T 13/745 |
| | | | | 303/10 |
| 2015/0360666 | A1 * | 12/2015 | Gerdes | B60T 11/18 |
| | | | | 60/545 |
| 2016/0068147 | A1 * | 3/2016 | Hatt | F16H 25/24 |
| | | | | 74/409 |
| 2018/0148029 | A1 * | 5/2018 | Friedrich | B60T 13/57 |
| 2018/0326958 | A1 * | 11/2018 | Petzold | B60T 13/143 |
| 2018/0355870 | A1 * | 12/2018 | Athipatla | F04C 29/061 |
| 2021/0309190 | A1 * | 10/2021 | Struschka | B60T 11/18 |

FOREIGN PATENT DOCUMENTS

| | | | |
|---|---|---|---|
| DE | 102014211551 A1 | 12/2015 | |
| WO | WO-2016009919 A1 * | 1/2016 | ............. B60T 11/18 |
| WO | WO-2016009927 A1 * | 1/2016 | ............. B60T 11/18 |
| WO | 2017/215812 A1 | 12/2017 | |

\* cited by examiner

ELECTRICALLY ACTIVATABLE ACTUATING UNIT FOR A MOTOR VEHICLE BRAKE SYSTEM, BRAKE BOOSTER HAVING SUCH AN ELECTRICALLY ACTIVATABLE ACTUATING UNIT AND MOTOR VEHICLE BRAKE SYSTEM HAVING SUCH A BRAKE BOOSTER

RELATED APPLICATIONS

The present invention claims priority from 102020109453.1, filed 3 Apr. 2020, the entirety of which is incorporated herein by reference.

TECHNICAL FIELD

The present disclosure relates generally to electrically activatable actuating units for motor vehicle brake systems. Specifically, aspects are described in connection with the suppression of undesired vibrations during the operation of such an actuating unit.

BACKGROUND

Known electrically activatable actuating units for a motor vehicle brake system are provided, for example, to boost an actuating force built up by the driver via the brake pedal so that the effort for the driver is reduced. This often takes place with the aid of an electrically activatable actuator, which, upon activation, brings about an adjustment movement of one or more components with which a brake pressure is increased or generated in a master brake cylinder. Known electrically activatable actuating units can also build up the necessary brake pressure themselves, independently of an actuation of the brake pedal, by activating the actuator, for example in an autonomous driving operation.

In motor vehicle brake systems having such electrically activatable actuating units, the brake pedal is often mechanically coupled, or in any case coupleable, to the components moved by means of the actuator. In the event of a braking procedure, for example in an autonomous driving operation, the brake pedal can thus be pulled along in the direction of the vehicle floor. If an obstacle (such as an object or a foot of the driver, for example) is located in the adjustment path of the brake pedal, i.e. between the brake pedal and the vehicle floor, the components connecting the brake pedal to the electrically activatable actuator are subjected to greater tensile stress. This can result in damage to the components connecting the brake pedal to the moved components and also an injury to the trapped foot.

To prevent these disadvantages, it is known to provide an elastically deformable intermediate element between a connecting component and a component moved by the actuator. This intermediate element is capable of restricting the tensile or pulling force acting on a trapped foot, for example, at least initially, until the further brake force build-up has been transmitted to another unit. Such an elastically deformable intermediate element is known, for example, from DE 10 2014 211 551 A1 and from WO 2017/215812 A1.

However, it has been observed that the elastically deformable intermediate element known from the prior art does not provide sufficient damping to prevent vibrations of the actuating unit occurring during the trapped state.

SUMMARY

The present disclosure is based on the object of providing an electrically activatable actuating unit for a motor vehicle brake, which is less vibration prone.

According to a first aspect, an electrically activatable actuating unit for a vehicle brake is provided, which has a housing body having a recess and an actuating member arranged in the recess of the housing body, wherein the actuating member is coupleable to a brake pedal at a first end and coupleable to a vehicle brake at a second, opposite end. The housing body and the actuating member are arranged to be displaceable in a braking direction to actuate the vehicle brake. The actuating unit furthermore has a damping element, which is arranged in the recess of the housing body such that it abuts frictionally against an outer wall of the actuating member by means of an inner circumferential face and abuts frictionally against an inner wall of the housing body by means of an outer, opposite circumferential face, which inner wall delimits the recess. The electrically activatable actuating unit can be provided to boost the brake force provided as a result of the actuation of a brake pedal. The electrically activatable actuating unit can also be provided to provide a brake force independently of the actuation of the brake pedal, for example in an autonomous or partially autonomous driving operation.

The electrically activatable actuating unit can act directly or indirectly, for example via a transmission. The transmission can be functionally provided between an electrically activatable electric motor of the actuating unit and the displaceable housing body.

The actuating member can be received only partially in the recess of the housing body. In particular, the actuating member can be received in the housing body such that it is displaceable relative to the housing body in the braking direction and in a direction contrary to the braking direction. The actuating member can, in particular, be displaced in the braking direction as a result of an actuation of the brake pedal and displaced back into a rest position again by means of the restoring force of a restoring spring and/or a master brake cylinder. The actuating member can act directly or indirectly on a pressure piston of a master brake cylinder of a motor vehicle brake system during a displacement in the braking direction to provide a brake pressure. The coupling can be realized mechanically and/or hydraulically. The coupling to the brake pedal can be realized via one or more force input members. In particular, the actuating member can be fixedly coupled to the brake pedal in the vehicle so that it is always coupled to the brake pedal. The actuating member can be designed as an actuating rod having a substantially circular cross-section.

The actuating member can furthermore be coupled to the housing body so that a displacement of the housing body can also result in a displacement of the actuating member. The actuating member can, in particular, be coupled to the housing body via further components of the actuating unit.

The housing body can be part of a housing of the actuating unit or an actuator. Upon electrical activation of the actuating unit, the housing body is displaced in the braking direction to actuate the vehicle brake. The housing body can also be coupled directly or indirectly to a pressure piston of the master brake cylinder so that a displacement of the housing body results in a displacement of the pressure piston and therefore in the build-up of a brake pressure. The housing body can furthermore be coupled to the actuating member so that a displacement of the housing body also results in a displacement of the actuating member.

The damping element has a first friction face (outer circumferential face), which frictionally contacts the housing body, and a second friction face (inner circumferential face), which frictionally contacts the actuating member. The damping element in some implementations is anchored to the housing body in a stationary manner by means of the first friction face. The damping element abuts frictionally against the actuating member by means of the second friction face. In the event of vibrations occurring in the electrically activatable actuating unit, in particular between the housing body and the actuating member, the vibrations can be damped by the friction established by means of the friction faces, in particular by means of the second friction face. Vibrations between the housing body and the actuating member which have a directional component in a direction parallel to the extent of the second friction face can also be damped.

The damping element can have a contact face, which is supported on a contact shoulder of the housing body. The contact shoulder can delimit the recess laterally, in particular in the direction of the second end of the actuating member, i.e. in the direction of the motor vehicle brake. The contact face can extend transversely to the inner and outer circumferential faces of the damping element. The contact face can face the motor vehicle brake. A further contact face-opposite the contact face-of the damping element can be supported on a restoring spring which is arranged in the recess of the housing body.

The amount of friction can be set, in particular, via the configuration, for example the size and roughness, of the second friction face (inner circumferential face). The amount of friction can also be determined via the material of the damping body and, in particular, the friction face. The inner circumferential face can be formed by a separate friction sleeve, which surrounds the actuating member in certain regions in any case. The damping element can be designed as one piece.

The damping element can come into effect, for example, when, in an autonomous driving operation, the brake pedal is pulled along during a movement of the housing body in the braking direction as a result of the coupling to the housing body. If an obstacle is located in the adjustment path of the brake pedal, a retaining force counteracts the pulling movement. The retaining force can result in a propensity for vibration in the electrically activatable actuating unit, and in particular between the parts moved as a result of the electrical activation and the connecting components to the brake pedal. This propensity for vibration can be reduced in any case by the damping element.

In one development, at least one of the circumferential faces of the damping element is designed to be elongated, at least in certain regions, in a direction perpendicular to a radial direction of the damping element. The at least one of the circumferential faces is, in particular, elongated, at least in certain regions, with respect to a circumferential face which is defined by the dimensions of a central base body of the damping element, which base body is spaced from the circumferential face. The at least one friction face is, therefore, designed to be elongated beyond the actual base body of the damping element, for example. The elongation can be such that only one or several regions of the at least one friction face are designed to be increased, or such that all of the at least one friction face is designed to be increased, in comparison to the inner circumferential face and/or outer circumferential face formed only by the base body. For example, the at least one circumferential face projects beyond the base body at least in certain regions, for instance in a direction perpendicular to the radial direction of the damping element (in the axial direction of the damping element). For example, in one configuration, the inner circumferential face can be elongated at least in certain regions and be greater than the outer circumferential face.

The inner circumferential face can form a friction sleeve, which projects laterally beyond the base body of the damping element. In another configuration, the outer circumferential face can be designed to be elongated, at least in certain regions, alone or in addition to the inner lateral face. The regions which are elongated at least in certain regions form an outer collar, which increases the friction face with respect to the housing body in comparison to a configuration without a collar. The frictional anchoring with respect to the housing body can be improved by means of the outer collar.

In a further development, the damping element can be designed in a disk shape, in particular the damping element can have a disk-shaped base body. The base body of the damping element can therefore have a greater extent in a radial direction than in a direction perpendicular to the radial direction. The extent in the direction perpendicular to the radial direction determines a thickness of the damping element. The direction perpendicular to the radial direction is an axial direction of the damping element, which can also be an axial direction of the actuating member. The cross-section of the disk-shaped damping element perpendicularly to a longitudinal axis of the actuating unit doesn't have to be circular; it can also have a polygonal form, for example.

In another further development, the damping element can surround the actuating member, at least in certain regions, in the circumferential direction of the actuating member. The damping element can surround the actuating member at least partially or in certain sections. In one configuration, the inner circumferential face of the damping element can delimit a central opening of the damping element. The actuating member can be guided through the central opening and be partially or completely surrounded by the inner circumferential face. The central opening can be an opening having a circular cross-section, for example when the actuating member has a circular cross-section.

In one configuration, the at least one of the circumferential faces of the damping element can have mutually spaced extensions arranged in the circumferential direction, which elongate the at least one circumferential face of the damping element in certain regions in a direction perpendicular to the radial direction of the damping element. The extensions can have any form; they can be claw-shaped or lug-shaped, evenly formed or tapered, for example. They can be arranged at the same spacing from one another; however, they can also be irregularly spaced from one another.

The frictional anchoring with respect to the housing body can be further increased in that, when the outer circumferential face of the damping element is designed to be elongated, at least in certain regions, in a direction perpendicular to the radial direction of the damping element, the elongated outer circumferential face abuts, elastically pre-tensioned, against the inner wall of the housing body. The elastic pre-tension can be realized, for example, in that the outer diameter of the damping body in the region of the extensions is greater than the inner diameter of the recess at the point which is provided for the installation of the damping element.

In a configuration of the damping element having the inner collar and the outer collar, the inner circumferential face of the damping element and the outer circumferential face of the damping element can be designed to be elongated, at least in certain regions, in the same direction or, alternatively to this, the inner circumferential face of the damping element and the outer circumferential face of the damping element can be designed to be elongated, at least in certain regions, in opposite directions. The inner and the outer collar in the installed state can therefore both face in the same direction, or in mutually opposite, parallel directions. In both cases, the inner and outer collar in the installed state extend substantially parallel to the axial extent of the actuating member.

The damping element can be designed as one piece. However, it can also be designed as multiple pieces. In particular, the inner circumferential face can be at least partially formed by a separately formed friction sleeve. In one variant, the separately formed friction sleeve provides the friction face of the damping element with respect to the actuating member. The separately formed friction sleeve can be fastened to the inner collar of the inner circumferential edge. As a result of the separate form, the friction face can be adapted to the specific requirements irrespective of the material and the configuration of the rest of the damping element.

The damping element can, in principle, be formed from any suitable material. In particular, it can be formed from metal and/or plastics material.

In one configuration, the electrically activatable actuating unit can have a restoring spring which is arranged in the recess, wherein the restoring spring has a first end, which abuts against a first lateral face of the damping element, and has a second end, which abuts against the actuating member. The restoring spring can be provided to pre-tension the actuating member with respect to the housing body in a rest position when an actuating force is not acting on the actuating member as a result of an actuation of the brake pedal.

In one development, the restoring spring, by means of its first end, can hold a second lateral face of the damping element in contact with a contact shoulder of the housing body. The restoring spring can therefore fix the damping element with respect to the housing body. The contact shoulder can be designed such that it extends from an outer region of the housing body into an inner region of the housing body and therefore projects into the recess.

In one possible configuration, the restoring spring can be a helical spring, and at least one inner circumferential face, which is elongated in certain regions, can project into an inner space of the helical spring which is formed by the helical spring. The inner collar can therefore project into the space formed by the windings of the helical spring. It is thus possible to provide an enlarged friction face with respect to the actuating member in a space-saving manner, without restricting the function of the actuating unit.

In this or another configuration, an elastic intermediate element can be provided, which reduces a tensile or pulling force acting on the actuating member during an, in particular autonomous, actuation of the vehicle brake. The reduced tensile or pulling force can be force contrary to the braking direction, in particular a retaining force. The elastic intermediate element ensures a gradual increase in the tensile or pulling force, wherein the rate of increase thereof is defined according to the elastic properties of the intermediate element. The tensile or pulling force acting on the actuating member can be reduced over a defined actuating path until the elastic deformability of the intermediate element is exhausted. The elastic intermediate element can be formed from an elastic material, for example from an elastomer or from a rubber material. The elastic intermediate element can also act as a spring element. The elastic intermediate element is, for example, part of an arrangement of one or more components which connects the actuating member to the housing body.

Therefore, in one development, the electrically activatable actuating unit can have a stop element, which restricts a displacement of the actuating member relative to the housing body in a direction contrary to the braking direction from a stop position. The displacement of the actuating member relative to the housing body can therefore be enabled up to the stop position and no longer enabled after the stop position is reached. The stop position can correspond to the relative rest position described above. The stop element can be connected to the actuating member and can couple the actuating member to the housing body via a stop face. In this development, the elastic intermediate element can be arranged between the stop element and the housing body in the stop position.

In a further variant, the actuating member can be arranged to be movable with respect to the damping element upon a displacement in the braking direction and in a direction contrary to the braking direction. The frictional connection between the damping element and the actuating member is therefore configured such that the displacement of the actuating member upon an actuation of the brake pedal is not impaired.

According to a further aspect, a brake booster is provided, which has an electrically activatable actuating unit according to the disclosure.

According to another further aspect, the brake booster can be part of a motor vehicle brake system.

BRIEF DESCRIPTION OF THE FIGURES

Further aspects, details and advantages of the present disclosure are revealed in the description below of exemplary embodiments with reference to the figures, in which.

DETAILED DESCRIPTION

Figure 1:
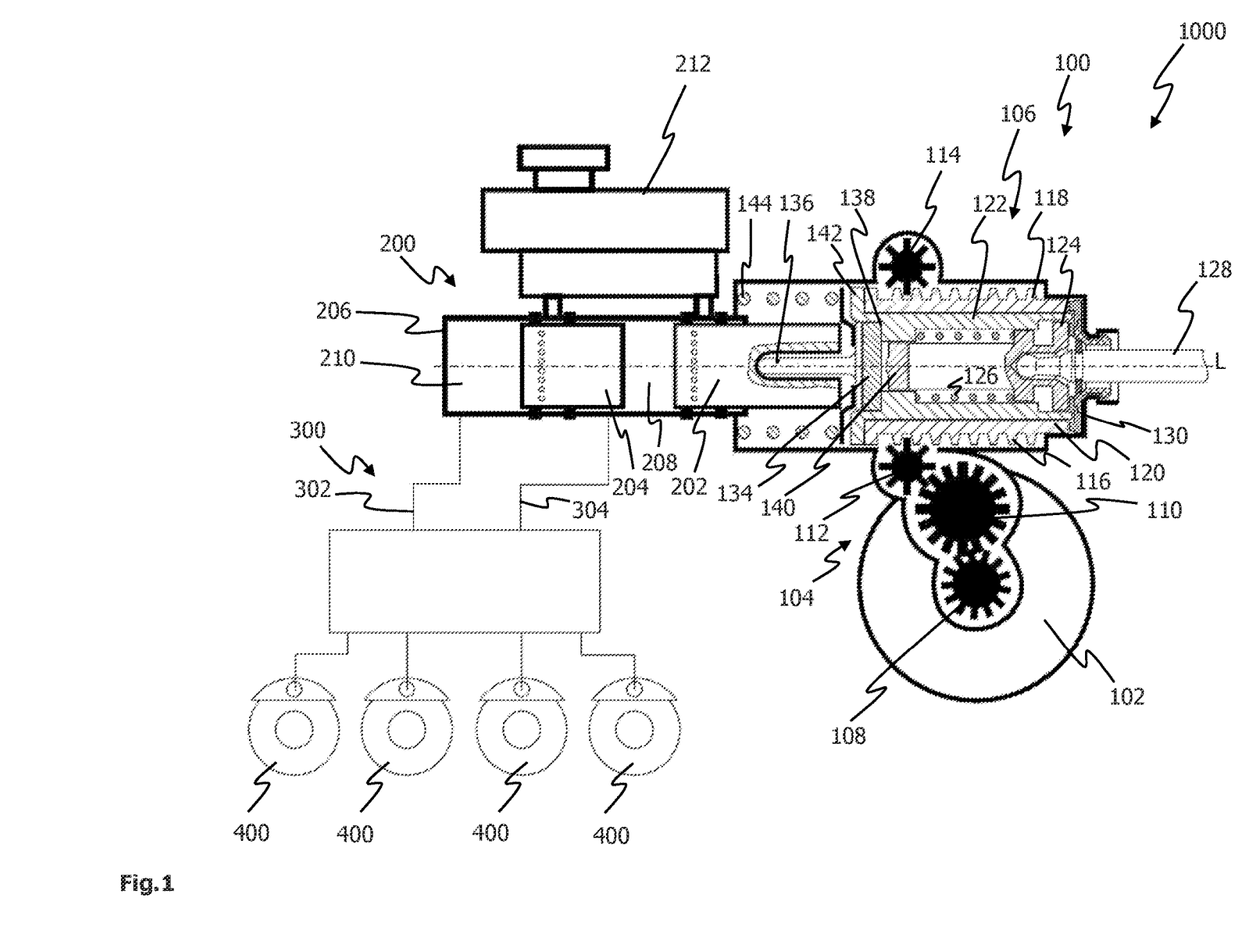
FIG. 1 schematically shows a motor vehicle brake system having a brake booster, which has an electrically activatable actuating unit.

A motor vehicle brake system 1000 having an electrically activatable actuating unit is shown in FIG. 1. The electrically activatable actuating unit is shown here as part of a brake booster. The construction and the mode of operation of the motor vehicle brake system 1000 according to FIG. 1, which could also be used as such in exemplary embodiments, shall be firstly described below.

The motor vehicle brake system 1000 according to FIG. 1 comprises a brake booster 100, a brake cylinder 200, two brake circuits 300 and four wheel brakes 400 connected to the brake circuits 300. The brake cylinder 200 in the exemplary embodiment is a master brake cylinder of the motor vehicle brake system 1000.

The brake booster 100 comprises an electrically activatable electric motor 102, a transmission 104 and an actuating unit 106. The brake booster 100 furthermore has a housing 130, in which at least the actuating unit 106 is received. The electric motor 102 has an output gear 108, which is coupled to two output-side spur gears 112, 114 via an intermediate gear 110 and possibly further spur gears or transmission components (not shown). The spur gears 112 and 114 are coupled to the actuating unit 106 of the brake booster 100. The actuating unit 106 comprises an actuating element 120 and a housing body 122 as a force-transmission element. The spur gears 112 and 114 are in engagement with gear rack portions 116 and 118 of the actuating element 120 of the actuating unit 106.

The housing body 122 has a recess (denoted by the reference sign 150 in FIGS. 2A, 3A and 4A), in which an actuating member 124 of the actuating unit 106 is received to be displaceable in the direction of a longitudinal axis L. The actuating member 124 is supported on a shoulder of the housing body 122 via a spring 126.

The actuating member 124 is coupled in an articulated manner to a force-input member 128. The force-input member 128 projects into the passenger space in a mounted state of the brake booster 100 in the vehicle (not shown). The force-input member 128 is coupled to a brake pedal arrangement in the passenger space of the vehicle. The force-input member 128 transmits the actuating force exerted on the brake pedal by the driver to the actuating unit 106 of the brake booster 100. Specifically, the force-input member 128 transmits the actuating force of the driver to the actuating member 124 of the actuating unit 106, which actuating member, under the compression of the spring 126, is displaced to the left with respect to FIG. 1 in order to be able to transmit the actuating force exerted by the driver to the master brake cylinder 200.

The actuating unit 106 furthermore has a rubber-elastic reaction disk 134, against which a force-application element 136 loosely abuts. The reaction disk 134 is received in the housing body 122 and abuts against an annular face 138 of the housing body 122, which extends perpendicularly to the longitudinal axis L and forms a contact face facing the master brake cylinder 200. The housing body 122 is able to apply a boosting force to the reaction disk 134 in the braking direction via this contact face 138, which reaction disk transmits this boosting force to the force-application element 136. The actuating member 124 has an end element 140, which, like the contact face 138, is designed to act on the reaction disk 134 and transmit the actuating force applied to the brake pedal by the driver.

The force-application element 136 is designed as a ram and has a pin-shaped portion. This pin-shaped portion is partially received in a first pressure piston 202 of the master brake cylinder 200 in a force-transmitting manner. In addition to the first pressure piston 202, the master brake cylinder 200 has a further pressure piston 204. The two pressure pistons 202 and 204 are fixed in a housing 206 of the master brake cylinder 202 having pressure chambers 208 and 210 filled with hydraulic fluid. The pressure chambers 208 and 210 in the master brake cylinder 200 are connected in each case to a brake circuit 302 and 304. A hydraulic brake pressure can be applied via the brake circuits 302 and 304 to two wheel brakes 400 in each case to execute a braking procedure. The master brake cylinder 200 is supplied with brake fluid via an unpressurized container 212.

The actuation of the brake booster 100 and therefore the assembly comprising the brake booster 100 and brake cylinder 200 can be effected by the driver of the vehicle. In this case, the driver of the vehicle actuates the brake pedal (not shown) and the actuating force exerted on the brake pedal by the driver is applied to the actuating unit 106 by the force-input member 128. As a result of the actuation of the brake pedal, the force-input member 128 and the actuating member 124 rigidly coupled to the force-input member 128 are moved to the left under the compression of the spring 126, wherein the end element 140 of the actuating member 124 penetrates into the rubber-elastic reaction disk 134.

Based on the actuating force exerted on the brake pedal by the driver and/or the actuating path of the brake pedal, it is possible to determine the boosting force to be generated by the electric motor 102 and the transmission 104, for example by means of a path sensor which is coupled to the brake pedal or the force-input member 128, or by measuring the brake pressure generated in the master cylinder 200 by the driver, which is sensor-detected and possibly plausibility-checked. Alternatively to this, the deceleration request and therefore the force applied to the master brake cylinder 200 by means of the actuating unit 106 can also be initiated by a system for autonomous or partially autonomous driving.

The boosting force (upon normal actuation of the brake pedal) or the total actuating force (in an autonomous or partially autonomous driving operation) is generated by the electric motor 102 and the transmission 104 and transmitted to the actuating element 120 of the actuating unit 106. The gear rack portions 116 and 118 of the actuating element 120 are driven via the spur gears 112 and 114 of the transmission 104. The actuating element 120 abuts against a contact shoulder 142 of the housing body 122 by means of an end face. The actuating element 120 can thus move the housing body 122 to the left along the longitudinal axis L upon an actuation of the brake booster 100 in FIG. 1. In the event of a driver-induced actuation of the brake booster 100, the housing body 122, by means of the contact face 138, and the end face of the end element 140 of the actuating member 124 act on the rubber-elastic reaction disk 134. The resultant force from the sum of the actuating force generated by the driver (if present) and the boosting force generated by the electric motor 106 and the transmission 104 (or actuating force in the event of autonomous or partially autonomous braking) is transmitted to the master brake cylinder 200 by the reaction disk 134 and the force-application element 136 abutting against it. A spring 144 arranged between the housing 130 of the brake booster 100 and the housing body 122 is thus compressed and the pressure piston 202 of the master brake cylinder 200 is moved to the left in the direction of the longitudinal axis L, whereby the second pressure piston 204 also moves to the left. A hydraulic brake pressure is thus generated in the pressure chambers 208 and 210. The brake pressure generated in the pressure chambers 208 and 210 is transferred to the wheel brakes 400 via the brake circuits 302 and 304 to execute a braking procedure.

After a braking procedure, the actuating unit 106 in FIG. 1 is moved back to the right again along the longitudinal axis L with respect to FIG. 1 by the restoring force of the spring 144 and the pressure in the pressure chambers 208, 210.

Figure 2A:
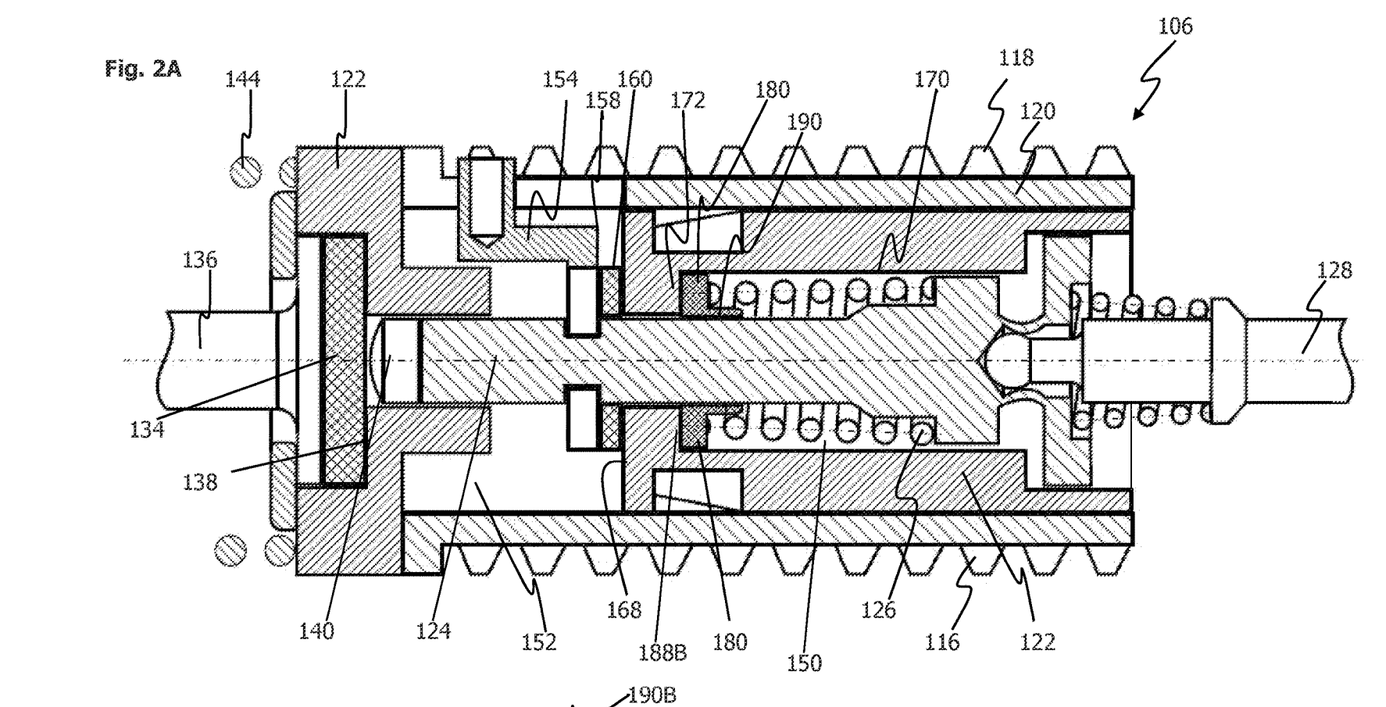
FIG. 2A schematically shows a sectional side view of an embodiment of an electrically activatable actuating unit according to the present disclosure, having a damping element according to a first embodiment, wherein FIG. 2B schematically shows a perspective view of the damping element according to the first embodiment.

FIG. 2A shows an actuating unit 106 according to the present disclosure in an enlarged view. In this case, elements of the actuating unit 106 of FIG. 2A, which correspond in each case to elements of the actuating unit 106 of FIG. 1, are provided with the same reference signs. The actuating unit 106 of FIG. 2A can have the same arrangement and function as shown in FIG. 1 with respect to the actuating unit 106 illustrated therein.

In FIG. 2A, the recess of the housing body 122 in which the actuating member 124 is partially received is denoted by the reference sign 150. In addition, it can be seen in the longitudinal section of FIG. 2A that the housing body 122 is formed as a hollow body. A recessed region 152 forms a further recess. A stop element 154, which extends transversely to the actuating direction of the actuating member 124 and is rigidly coupled to the actuating member 124 at a first end, is received in the recessed region 152. At a second, opposite end, the stop element 154 projects outwards through a window formed in the housing body 122 in order to be mechanically coupled to a movable element of a path sensor which is arranged there. It is thus possible to quantitatively detect the movement of the actuating member 124 by means of the path sensor.

The first end of the stop element 154 can be coupled to the actuating member 124 in any possible manner. The stop element 154 can, for example, engage in correspondingly formed recesses of the actuating member 124, the stop element 154 can be guided through a through-opening of the actuating member 124 or, at the first end, the stop element 154 can be formed such that it surrounds the actuating member 124 circumferentially, for example. The stop element 154 here has a forked push-on portion, which enables the stop element 154 to be pushed onto the actuating element 124 transversely to its longitudinal axis, wherein the opposing forks engage in the circumferential, groove-shaped depression in the actuating element 124. In the example shown here, the stop element 154 has the form of a "double" L in the sectional view, although it can also have any other suitable form. The important factor is that the stop element 154 forms a stop face, which can cooperate with a corresponding stop face of the housing body 122.

Therefore, the stop element 154 has a stop face 158 which enables a displacement of the actuating member 124 relative to the housing body 122 in the direction contrary to the braking direction, i.e. to the right in the direction of the longitudinal axis L with respect to FIG. 2A, and cooperates with a corresponding stop face 168 of the housing body 122. An elastic intermediate element 160, which will be explained in more detail below, is arranged between the stop face 158 of the stop element 154 and the stop face 168 of the housing body 122.

The state shown in FIG. 2A, in which the stop faces 158, 168 cooperate with one another, corresponds to a rest position of the actuating member 124 relative to the housing body 122. The relative rest position is defined by the restoring force of the spring 126 and the two stop faces 158, 168.

The stop faces 158, 168 define the relative rest position between the housing body 122 and the actuating member 124, as was explained above. Moreover, they serve as coupling faces between the actuating member 124 and the housing body 122 during a movement of the housing body 122 in the braking direction in the event of an autonomous actuation of the brake booster. As described with respect to FIG. 1, a torque generated by the electric motor 102 is transmitted to the actuating element 120 of the actuating unit 106 via the transmission 104, and from there to the housing body 122 via the contact shoulder 142. In the event of an autonomous actuation of the brake booster 100, which then functions as a (single) actuating-force generator, as a result of the coupling of the housing body 122 to the actuating member 124, the actuating member 124 is also moved in the braking direction (via the stop element 154 connected to the actuating member 124), independently of an actuation of the brake pedal by the driver.

If the deceleration request and therefore the actuating force generated by means of the actuating unit 106 is initiated by a system for autonomous or partially autonomous driving, the actuating member 124 is therefore also moved in the braking direction via the connection of the actuating member 124 to the housing body 122 via the stop element 154. Since the actuating member 124 is coupled to the brake pedal via the force-input member 128, the brake pedal is also moved in the direction of the vehicle floor.

If an obstacle is located in the adjustment path of the brake pedal, i.e. between the brake pedal and the vehicle floor, a retaining force (pulling force) contrary to the braking direction acts on the brake pedal and the connecting components between the brake pedal and the components of the actuating unit 106 which are moved by the electric motor. In particular, a retaining force acting in the tensile direction (contrary to the braking direction) acts on the actuating member 124 and the force-input member 128, which retaining force can result in damage to components.

The elastic intermediate element 160 arranged between the stop face 158 of the stop element 154 and the stop face 168 of the housing body 122 now acts as a transmission element and is elastically deformed when such a retaining force acts contrary to the braking direction. The elastic deformation brings about a reduction in the retaining force acting on the components.

According to the present disclosure, a damping element 180 is provided in the recess 150 which is formed by the housing body 122 and in which the actuating member 124 is also arranged. The damping element 180 is illustrated in a perspective side view in FIG. 2B. The damping element 180 comprises a base body formed in a disk shape and has a central opening 182 having a circular cross-section. The disk-shaped damping element 180 is therefore formed, in particular, in a ring-shape. The damping element 180 can be formed from plastics material (e.g. an elastomer) or—at least in certain regions-from another vibration-damping material such as a spring plate.

Figure 2B:
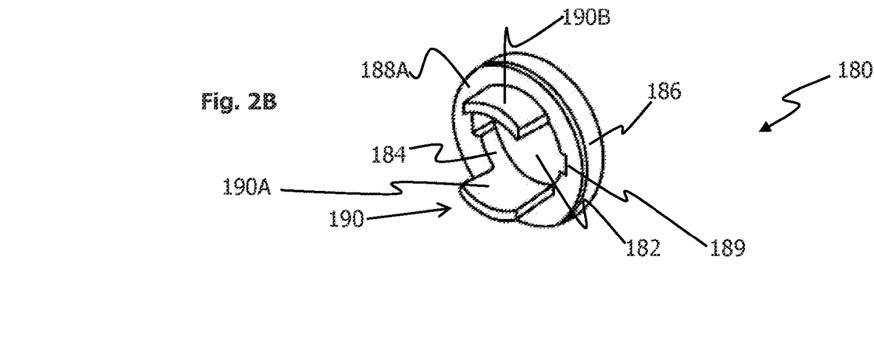

The damping element 180 has an inner circumferential face 184, which delimits the opening 182 in the radial direction and extends in the circumferential direction, and an outer circumferential face 186, which delimits the damping element 180 outwardly in the radial direction and likewise extends in the circumferential direction. The inner circumferential face 184 is therefore arranged opposite the outer circumferential face 186.

Moreover, the damping element 180 has two lateral faces 188A (FIG. 2B), 188B (FIG. 2A), which connect the inner circumferential face 184 and the outer circumferential face 186 to one another in each case. The inner circumferential face 184 has a collar 190 in certain regions, which elongates the inner circumferential face 184 in a direction perpendicular to the radial direction in these regions compared to the thickness of the disk-shaped base body, i.e. in the axial direction of the damping element 180. In the example shown here, the collar 190 comprises two tongue-like portions 190A, 190B, which elongate the inner circumferential face 184 in a direction perpendicular to the radial direction in these portions. However, more or fewer of such portions 190A, 190B can also be provided.

The damping element 180 therefore has a disk-shaped base body having the central opening 182. The disk-shaped base body has an inner circumferential face 184, an outer circumferential face 186 and two lateral faces 188A, 188B.

The collar 190 projects laterally beyond this base body. In particular, it elongates the inner circumferential face 184 in certain regions with respect to the inner circumferential face 184 defined by the base body.

The arrangement of the damping element 180 in the actuating unit 106 is shown in FIG. 2A. The damping element 180 is arranged in the recess 150 such that the actuating member 124 projects through the central opening 182 of the damping element 180 and the inner circumferential face 184 of the damping element 180 abuts frictionally against the surface of the actuating member 124. The damping element 180 surrounds the actuating member 124 completely in the embodiment shown here. The damping element 180 is seated in the housing body 122 in a stationary manner by means of frictional contact. The positioning is furthermore promoted by the effective force of the restoring spring 126, which is supported by one end on the damping element 180. The actuating member 124 slides through the inner opening 182 of the damping element 180 upon actuation, wherein the friction of the two components 124, 180 in this contact region is used for damping purposes. In other words, in functional terms, the damping element can also be seen as part of the housing body 122. In this case, the elongated portions 190A have contact diameter which is slightly smaller than the outer diameter of the actuating member 124, thereby enabling a frictional contact which generates the necessary damping through friction upon a relative movement of the two components 124, 180 with respect to one another. The amount of friction is essentially dependent on the size of the contact face of the damping element and the composition of the contact surfaces. In this case, the form, size and/or composition of the contact faces 190A is selected such that the necessary friction for damping purposes is achieved and, at the same time, the necessary displaceability of the actuating member 124 is ensured and is not hindered unnecessarily so as to increase the necessary actuating force for the actuation unnecessarily. The damping element 180 furthermore has recesses 189 formed on the inner circumferential face 184, by means of which the amount of friction can also be set. By increasing or reducing the recesses 189, the damping element can be easily adapted to differently configured brake boosters.

The outer circumferential face 186 of the damping element 180 abuts frictionally against an inner wall 170 of the housing body 122, which inner wall delimits the recess 150. The outer diameter of the damping element 180 is therefore substantially the same size as, or somewhat greater than, the inner diameter of the recess 150 at this point of the housing body 122.

The damping element 180 is furthermore arranged such that one of the two lateral faces 188A, 188B of the damping element 180 is in contact with the housing body 122, in particular in contact with a contact shoulder 172 of the housing body 122. The spring 126 is supported by one end on the other of the two lateral faces 188B, 188A of the damping element 180. In particular, the damping element 180 is arranged such that the collar 190 faces with the lateral face 188A in the direction of the inner recess 150, whilst the lateral face 188B abuts against the contact shoulder 172, which terminates the recess 150 in the direction of the master brake cylinder 200.

Figure 3A:
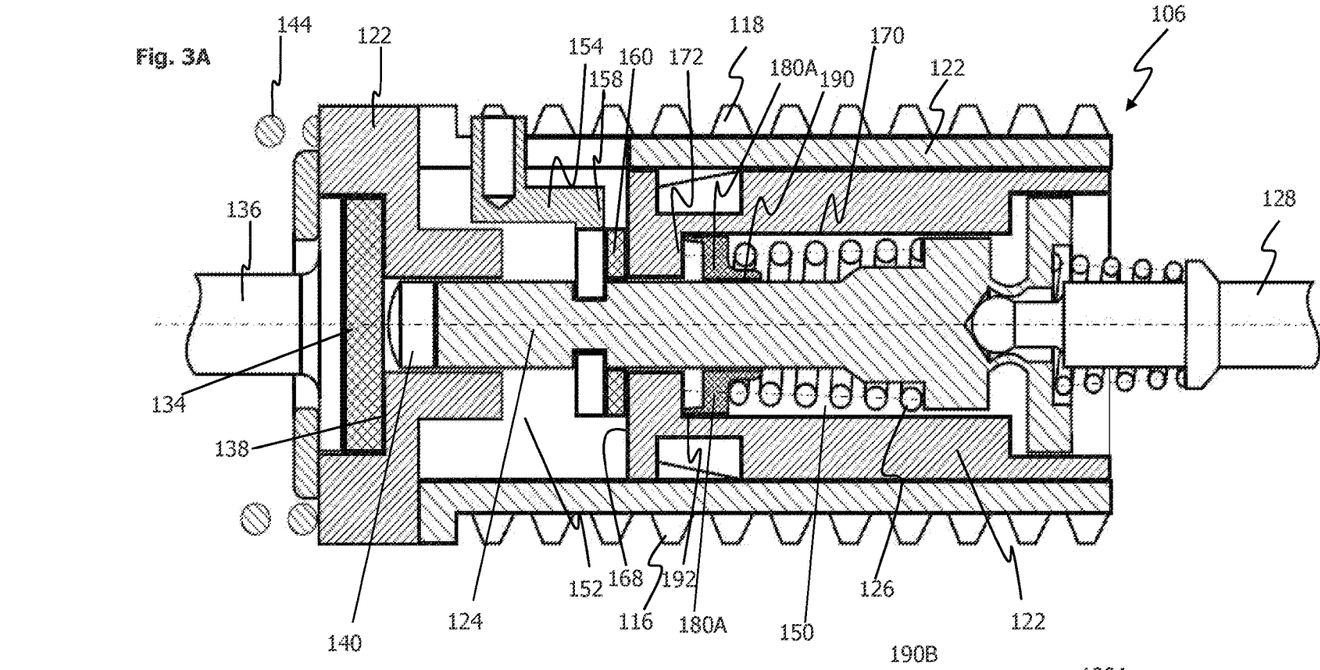
FIG. 3A schematically shows a sectional side view of an embodiment of an electrically activatable actuating unit according to the present disclosure, having a damping element according to a second embodiment, wherein FIG. 3B schematically shows a perspective view of the damping element according to the second embodiment.
Figure 3B:
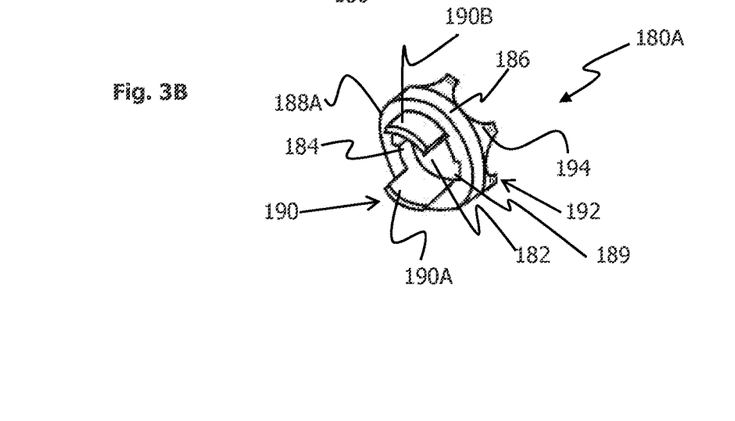

A further embodiment of a damping element 180A is shown in FIGS. 3A and 3B. The further embodiment has all the features of the embodiment described with respect to FIGS. 2A and 2B. In addition, the damping element 180A is elongated in certain regions on the outer circumferential face 186 in a direction perpendicular to the radial direction. The regions which are elongated in certain regions form a further or outer collar 192, which increases the contact face of the damping element 190 with respect to the housing body 122. The regions which are elongated in certain regions form individual extensions 194 here, in particular claw-like extensions in a direction perpendicular to the radial direction. The extensions 194 can taper to their ends, as is shown here, and therefore have a pointed form. The extensions 194 are arranged spaced from one another in the circumferential direction of the damping element 180A. In the example shown here, the extensions 194 are arranged at the same spacing from one another. As shown in FIG. 3A, the collar 190 formed on the inner circumferential face 184 is directed in the direction of the inner recess 150 of the housing body 122, as is also the case for the damping body 180 of FIG. 2A, and the further collar 192 formed on the outer circumferential face 186 is aligned in the opposite direction and faces in the direction of the contact shoulder 172 of the housing body 122. In particular, the outer ends of the extensions 194 of the further collar 192 are supported on the contact shoulder 172. The spring 126 is again supported on the lateral face 188A of the damping element 180A, which faces the inner recess 150.

The damping element 180A of FIG. 3B can be designed such that the extensions 194 are elastically pre-tensioned after the installation of the damping element 180A in the recess 150 of the housing body 122. The elastic pre-tension can be realized, for example, in that the outer diameter of the damping element 180A at the extensions 194 is greater than the inner diameter of the region of the recess 150 in which the extensions 194 are arranged. The anchoring of the damping element 180A in the recess 150 of the housing body 122 is improved as a result of the elastic pre-tension of the extensions 194 in the installed state of the damping element 180A. The damping element 180A of FIG. 3B can likewise be formed from plastics material, in particular an elastomer.

Figure 4A:
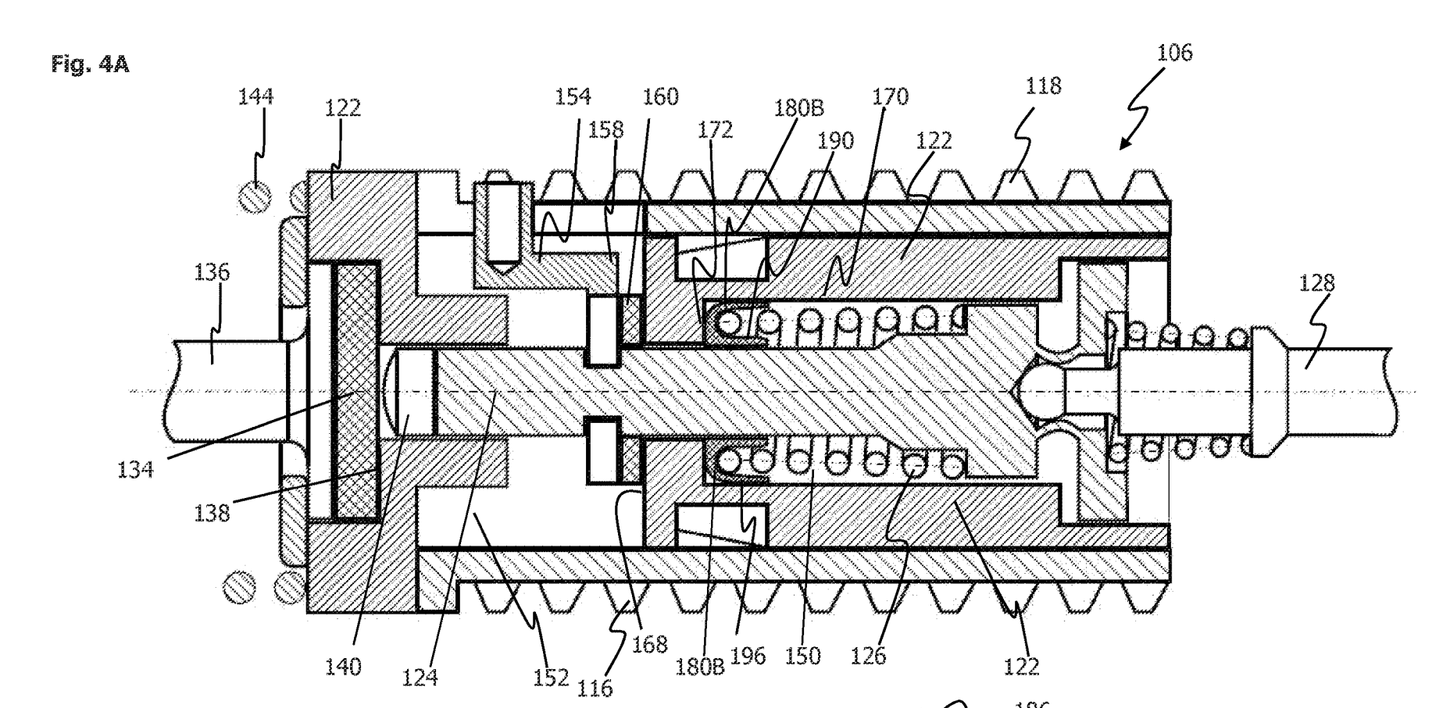
FIG. 4A schematically shows a sectional side view of an embodiment of an electrically activatable actuating unit according to the present disclosure, having a damping element according to a third embodiment, wherein FIG. 4B schematically shows the damping element according to the third embodiment in a perspective side view (drawing on the left) and a cross-section in a plan view (drawing on the right).
Figure 4B:
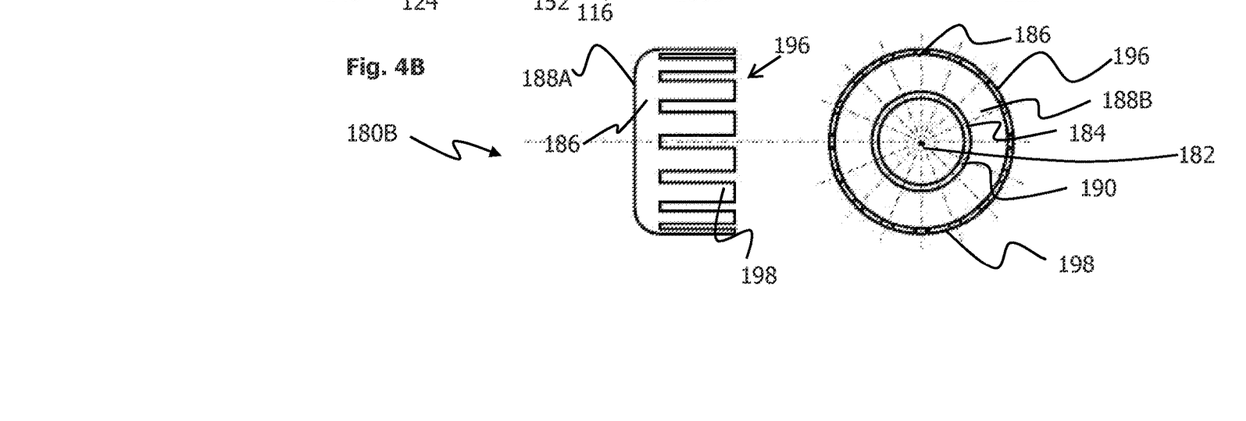

Another further embodiment of a damping element 180B is shown in FIGS. 4A and 4B. The damping element 180B of FIG. 4B is designed similarly to that of FIG. 3B and has a collar 190 formed on the inner circumferential face 184 and an outer collar 196 formed on the outer circumferential face 186. In contrast to the embodiment of FIGS. 3A and 3B, the collar 196 elongating the outer circumferential face 186 extends in the same direction with respect to the disk-shaped base body, i.e. with respect to the lateral faces 188A, 188B for example, as the collar 190 elongating the inner circumferential face 184. The inner circumferential face 184 and the outer circumferential face 186 both extend in the direction of the inner recess 150 in the installed state. The outer circumferential face 186 likewise has extensions 198 arranged in the circumferential direction and spaced in the circumferential direction. In the example shown here, the extensions 198 are evenly spaced, in the same way as the extensions 194 of FIGS. 3A and 3B. The extensions 198 are claw- or lug-shaped and are not tapered towards their ends, but extend with the same width in a direction perpendicular to the radial direction. However, it is also possible that the extensions 198 are designed to be tapered as shown in FIG. 3B. The collar 190 elongating the inner circumferential face 184 can be designed as shown in FIG. 2B, but it can also have spaced extensions 194, 198 like the outer circumferential face 186 of FIGS. 3B and 4B. In the example shown here, the inner circumferential face 184 is elongated by means of the same extensions 198 as the outer circumferential face 186.

Like the damping element 180A of FIG. 3B, the damping element 180B of FIG. 4B can be designed such that the extensions 198 are elastically pre-tensioned after the installation of the damping element 180B in the recess 150 of the housing body 122. The elastic pre-tension can be realized, for example, in that the outer diameter of the damping element 182 at the extensions 198 is greater than the inner diameter of the region of the recess 150 in which the extensions 198 are arranged. The damping element 180B of FIGS. 4A and 4B can be formed from a metal plate, for example a deep-drawn metal plate.

In the embodiments described above, the damping element 180, 180A, 180B is preferably formed as one piece. However, the damping element 180, 180A, 180B can also be formed in multiple parts.

Therefore, in another embodiment (not illustrated), the collar 190 of the inner circumferential face 184 can be provided with an additional friction element mounted thereon, in particular a friction sleeve, by means of which the direct contact with the actuating member 124 can then be established. The friction element can cover only the collar 190 and, optionally, the regions of the inner circumferential face 184 which are associated with the collar 190; however, it can also be provided over the entire collar 190 and the entire inner circumferential face 184, and, in particular, it can also extend beyond the collar 190, both in the circumferential direction and in the axial direction.

A multi-part embodiment has the advantage over a single-part embodiment in that it does not involve a functionally restrictive compromise between the producibility and the frictional behavior.

If a retaining force (pulling force) contrary to the braking direction acts on the brake pedal and the connecting components between the brake pedal and the components of the actuating unit 106 which are moved by the electric motor 102, in particular on the actuating member 124 and the force-input member 128, this force can be reduced by the elastic intermediate element 160 arranged between the stop face 158 of the stop element 154 and the stop face 168 of the housing body 122. However, in some situations, the damping by the elastic intermediate element 160 is insufficient to prevent a vibration of the system as a whole.

The damping element 180, 180A, 180B according to the present disclosure is provided to restrict vibrations occurring when a retaining force is in effect. To this end, the damping element 180, 180A, 180B abuts frictionally against the actuating member 124 and against the housing body 122. The frictional connection is selected, in particular, in such a way that the damping element 180, 180A, 180B is anchored to the housing body 122 in a stationary manner at the outer circumferential edge. The friction face provided by the inner circumferential face 184 or on the inner circumferential face 184 is dimensioned and/or designed such that a defined friction damping the vibrations of the actuating member 124 is built up between the actuating member 124 and the damping element 180, 180A, 180B. In particular, due to the design of the inner collar 190, the contact face with respect to the actuating member 124 can be dimensioned and configured to generate a predetermined, desired amount of friction.

The solution disclosed here is, in particular, suitable for electrically controlled actuating units which provide a direct mechanical coupling of the brake pedal to an electromechanically driven component of the respective actuating unit, in which the brake pedal is therefore pulled along in the event of autonomous or partially autonomous braking. In the case of the solutions known from the prior art, the vibrations occurring in the event of a trapped state during autonomous braking hinder the sensory detection of the trapped state as such. By means of the disclosed damping element, such vibrations can be reduced and the trapped state can therefore be reliably detected. When the trapped state is detected, the further brake pressure build-up can then be transmitted to another unit, for example the hydraulic pump of an electronic stability control (ESC), and the electric motor 102 can induce a movement of the actuating unit 106 contrary to the braking direction in order to reduce the clamping force.

What is claimed is:

1. An electrically activatable actuating unit for a motor vehicle brake system, having
a housing body having a recess,
an actuating member arranged in the recess of the housing body, wherein the actuating member is coupleable to a brake pedal at a first end and coupleable to a motor vehicle brake at a second, opposite end,
wherein the housing body and the actuating member are arranged to be longitudinally displaceable in a braking direction to actuate the vehicle brake, and having
a damping element configured to dampen vibrations occurring in the actuating unit, the damping element includes a body having radially opposite inner and outer circumferential faces and longitudinally opposite first and second lateral faces, the damping element including circumferentially spaced projections that extend longitudinally from one of the first and second lateral faces and directly elongate portions of the inner circumferential face in the longitudinal direction, the longitudinal direction being perpendicular to a radial direction of the damping element, wherein the damping element is arranged in the recess of the housing body such that the damping element abuts frictionally against an outer wall of the actuating member by means of the inner circumferential face and abuts frictionally against an inner wall of the housing body by means of the outer circumferential face, which inner wall delimits the recess.

2. The electrically activatable actuating unit as claimed in claim 1,
wherein the outer circumferential face of the damping element has mutually spaced extensions arranged in the circumferential direction, which extend from one of the first and second lateral faces and directly elongate portions of the outer circumferential face of the damping element in the longitudinal direction.

3. The electrically activatable actuating unit as claimed in claim 1,
wherein at least a portion of the outer circumferential face of the damping element is designed to be elongated in the longitudinal direction and abuts, elastically pre-tensioned, against the inner wall of the housing body.

4. The electrically activatable actuating unit as claimed in claim 3,
wherein at least a portion of the inner circumferential face of the damping element and at least a portion of the outer circumferential face of the damping element are designed to be elongated in the same direction.

5. The electrically activatable actuating unit as claimed in claim 3,
wherein at least a portion of the inner circumferential face of the damping element and at least a portion of the outer circumferential face of the damping element are designed to be elongated in longitudinally opposite directions.

6. The electrically activatable actuating unit as claimed in claim 1, wherein the body of the damping element is formed in a disk shape.

7. The electrically activatable actuating unit as claimed in claim 1,
wherein the damping element at least partially surrounds the actuating member in the circumferential direction of the actuating member.

8. The electrically activatable actuating unit as claimed in claim 1,
wherein the inner circumferential face of the damping element delimits a central opening of the damping element.

9. The electrically activatable actuating unit as claimed in claim 1,
wherein the damping element is formed from metal and/or plastics material.

10. The electrically activatable actuating unit as claimed in claim 1,
having a restoring spring which is arranged in the recess, wherein the restoring spring has a first end, which abuts against the first lateral face of the damping element, and has a second end, which abuts against the actuating member.

11. The electrically activatable actuating unit as claimed in claim 10,
wherein the restoring spring, by means of its first end, holds the second lateral face of the damping element in contact with an axially facing contact shoulder of the housing body.

12. The electrically activatable actuating unit as claimed in claim 10,
wherein the restoring spring is a helical spring, and at least a portion of the inner circumferential face of the damping element projects into an inner space of the helical spring.

13. The electrically activatable actuating unit as claimed in claim 11,
wherein the first end of the restoring spring abuts directly against the first lateral face of the damping element, and the second end of the restoring spring abuts directly against an axially facing contact shoulder of the actuating member, the contact shoulder of the actuating member facing the contacting shoulder of the housing body.

14. The electrically activatable actuating unit as claimed in claim 13,
wherein the actuating member is a one-piece construction with the contacting shoulder of the actuating member being an integral portion of the actuating member.

15. The electrically activatable actuating unit as claimed in claim 1,
wherein an elastic intermediate element is provided, which reduces a tensile force acting on the actuating member during the actuation of the motor vehicle brake by electrically activating the actuating unit.

16. The electrically activatable actuating unit as claimed in claim 15,
wherein the electrically activatable actuating unit has a stop element, which restricts a displacement of the actuating member relative to the housing body in a longitudinal direction contrary to the braking direction from a stop position, and wherein the elastic intermediate element is arranged between the stop element and the housing body in the stop position.

17. The electrically activatable actuating unit as claimed in claim 1,
wherein the actuating member is arranged to be movable with respect to the damping element upon a displacement in the braking direction and in a direction longitudinally contrary to the braking direction.

18. A brake booster, having an electrically activatable actuating unit as claimed in claim 1.

19. A motor vehicle brake system, having the brake booster as claimed in claim 18.

20. The brake booster as claimed in claim 18, having
a housing in which the actuating unit is received, the actuating member being positioned entirely within the housing; and
a force-input member directly coupled to the first end of the actuating member and coupling the actuating member to the brake pedal, the force-input member extending from the brake pedal into the housing.

21. The brake booster as claimed in claim 18,
wherein the actuating unit includes an actuating element at least partially surrounding the housing body along an outer periphery of the housing body, the brake booster further having
an electric motor and a transmission, gear teeth of the transmission being meshed with external teeth of the actuating element such that a force generated by the electric motor is applied to the housing body via the transmission and the actuating element.

22. The electrically activatable actuating unit as claimed in claim 1,
wherein vibrations occurring between the housing body and the actuating member are damped via friction between the dampening element and at least one of the housing body and the actuating member.

23. The electrically activatable actuating unit as claimed in claim 1,
wherein the damping element is configured to dampen vibrations that occur when the actuating member is subject to a retaining force that acts on the actuating member in a longitudinal direction opposite the braking direction.

24. The electrically activatable actuating unit as claimed in claim 1, having
a force-input member directly coupled to the first end of the actuating member and coupling the actuating member to the brake pedal.

25. The electrically activatable actuating unit as claimed in claim 1, having
a force-application element arranged operatively between the vehicle brake and each of the housing body and the actuating member, displacement of the housing body and the actuating member in the braking direction actuating the vehicle brake through the force-application element in the braking direction.

* * * * *